United States Patent Office 3,268,482
Patented August 23, 1966

3,268,482
PREPARATION OF POLYESTERS
Aleksander Piirma, Stow, Maria V. Wiener, Akron, and Warren K. Wilson, Cuyahoga Falls, Ohio, assignors to The Goodyear Tire & Rubber Company, Akron, Ohio, a corporation of Ohio
No Drawing. Filed Sept. 27, 1962, Ser. No. 226,729
8 Claims. (Cl. 260—75)

This invention relates to the preparation of glycol esters of polycarboxylic acids. More particularly this invention relates to an improvement in the preparation of superpolyesters by the alcoholysis of esters of polycarboxylic acids with a glycol and the subsequent polymerization of these glycol esters to high polymeric linear polyesters.

In the preparation of linear superpolyesters the most satisfactory method from the standpoint of simplicity of reaction and economy of operation has been the ester interchange method in which esters of the acids are reacted with a glycol to form the diglycol ester of the acid or a low molecular weight polymeric polyester which is then polymerized to a high molecular weight polymeric polyester by condensation reaction with splitting out of the glycol. In order to prepare linear polymers of high molecular weight it is necessary to use materials of high purity because some impurities interfere with the alcoholysis reaction and with the condensation reaction and lower the degree to which the glycol ester can be polymerized.

It has been found that water, even in trace amounts, seriously affects these reactions. Water has a very deleterious effect on the rate of alcoholysis of esters of polycarboxylic acids with a glycol, particularly esters such as dimethyl terephthalate or dimethyl isophthalate or mixtures of these esters with a glycol.

The reaction between the dimethyl esters of terephthalic acid or isophthalic acid or mixtures of these esters and ethylene glycol has been found experimentally to be of the second order type. The addition of 0.14% of the weight of the glycol of water to glycol used in carrying out an ester interchange reaction with these esters caused an 85% drop in the reaction rate constant when litharge was used as the ester interchange catalyst.

The following table illustrates the effect of water in the glycol on the reaction rate constant (K), where K is the specific reaction rate constant calculated for the reaction of ethylene glycol with dimethyl phthalate esters.

TABLE 1.—EFFECT OF WATER IN THE GLYCOL ON SPECIFIC REACTION RATE CONSTANT (K)

| Ester | Ratio of Ester to Glycol (Moles) | Remarks | Specific Reaction Rate (K) moles/liter/second |
|---|---|---|---|
| Dimethyl Isophthalate | 1 to 3.0 | (Control) | $3.0 \times 10^{-5}$ |
| Do | 1 to 3.0 | 0.14% Water | $0.43 \times 10^{-5}$ |
| Do | 1 to 3.0 | 1.35% Water | $0.19 \times 10^{-5}$ |

The constant K is obtained from the equation for the second order type reaction, $$K = \frac{2.303}{t(a-b)} \log \frac{b}{a}\left(\frac{a-x}{b-x}\right)$$

in which $a$ is the concentration of glycol in moles per liter, $b$ is the concentration of ester in moles per liter, $x$ is the amount of $a$ or $b$ reacting in time $t$, and $t$ is the time in minutes, by the graphical method in which $$\log \frac{b}{a} \frac{(a-x)}{(b-x)}$$

is plotted against time. The calculations for K are based on the straight line portion of the curve obtained in the above plot.

Moisture has other deleterious effects. It acts as a hydrolytic agent causing a breakdown or hydrolysis of esters into acidic materials and alcohols. Acidic materials catalyze hydrolysis reactions and once hydrolysis is started the rate of hydrolysis increases so long as water is present. Acidic materials also promote undesirable reactions such as the etherification of ethylene glycol to form diethylene glycol. Some ester interchange catalysts are deactivated or precipitated by acidic materials.

In the production of high molecular weight polyesters by ester interchange and condensation reactions it has been found that the molecular weight or degree of polymerization obtainable in a polyester is affected by the degree to which the ester interchange reaction is completed before condensation is started. Thus, when the condensation reaction is carried out at a temperature above 240° C., the polyesters prepared have a higher molecular weight if the ester interchange reaction is essentially complete before 240° C. is reached, than they have if the ester interchange reaction is not complete before this temperature is reached.

Moisture and acidity influence the degree of completion obtainable in the ester interchange reaction. Absence of moisture and acidity promote completion of the ester interchange reaction in relatively short reaction time. It has been found that when the moisture was completely removed from the reactants and equipment in the production of a polymeric polyester such as polyethylene terephthalate by ester interchange and condensation, a better quality product was obtained than could be obtained from reactants and equipment containing water, even in trace amounts. It is important, therefore, to use dry apparatus and reactants that are substantially free of water and which contain a minimum of free acid groups.

In preparing polyesters such as the high molecular weight linear terephthalate and isophthalate polyesters and copolyesters by ester interchange and condensation reactions, according to prior art practices the terephthalate or isophthalate ester starting materials such as the dimethyl esters or mixture of these esters were dried in forced draft ovens or by storing them over dessicants. The glycol used in the alcoholysis reaction was dried by distilling off a portion which carried off the water. These dried materials were stored where they would remain anhydrous until they were used. When used they are placed in dry reaction equipment and the glycolysis and condensation reactions were run using these separately dried materials.

It is an object of this invention to provide an improved process for preparing high molecular weight linear polyesters. Another object is to provide an improvement in the ester interchange process for preparing glycol esters of polycarboxylic acids. A further object is to provide a process for removing free water from organic materials such as esters and glycols. A still further object is to provide a process for stabilizing esters against hydrolytic degradation. These and other objects will more clearly appear hereinafter.

These objects are accomplished by the present invention in which free water is removed from an organic material by adding a neutral organic compound selected from the group consisting of acetals, organic orthoesters, organic carbonate esters and cyclic ethers containing from three to four atoms in the cyclic ring to an organic material which contains water and reacting the additive with free water in the organic material.

It has been found that acid number of an ester such as dimethyl terephthalate stored in molten state in steel drums increases over a period of time. This increase in acid number can be minimized or prevented by adding a compound of the invention to the terephthalate ester to react with any free water already present or to react with water absorbed during storage. The effectiveness of the invention in stabilizing such esters is illustrated by the following examples.

*Example 1*

Two 75 gram samples of dimethyl terephthalate were placed in two small screw-cap bottles. One bottle to which nothing else was added was used as a control. To the other there was added 1.16 percent (0.87 gram) of 2,2-dimethoxypropane. The bottles were capped with screw caps having inert gaskets made of polytrifluorochloroethylene and stored at room temperature for 24 hours. The bottles were then placed in an oven, heated at 166° C. and kept at this temperature for one week. Acid numbers of the samples were determined and are listed below:

| | Acid No. |
|---|---|
| Original dimethyl terephthalate | 0.044 |
| Control, after one week at 166° C. | 0.75 |
| Original+2,2-dimethoxypropane, after one week at 166° C. | 0.13 |

The data shows that the acid number of the ester stabilized with 2,2-dimethoxypropane increased very little whereas the acid number of the unstabilized ester increased greatly.

The following examples further illustrate the invention as used in the preparation of high molecular weight linear polyesters.

*Example 2*

A glass reaction vessel in the shape of a tube approximately 35 centimeters long, with an inside diameter of 38 millimeters, having a side arm, and equipped with a nitrogen gas inlet tube and a stirrer was charged with 58.2 grams of dimethyl terephthalate, 41 grams of ethylene glycol, 0.0174 gram of zinic acetate, 0.0174 gram of antimony trioxide, and 0.13 gram of distilled water. One gram of 2,2-dimethoxypropane was added. The mixture was stirred and heated by means of a vapor bath having a temperature of 217° C. while a slow stream of oxygen-free nitrogen gas was passed over the reaction mixture. The alcoholysis reaction was complete in 55 minutes when approximately the theoretical amount of methanol recoverable had distilled out of the mixture. Then the vapor bath was replaced by another vapor bath having a temperature of 245° C. The mixture was heated at 245° C. and the pressure in the reactor was slowly reduced over a period of 45 minutes to 1.4 millimeters of mercury pressure as the excess glycol distilled out of the mixture. The vapor bath was again changed and replaced by one boiling at 280° C. The mixture was heated for two hours at 280° C. and 1.4 millimeters of mercury pressure. The polymer formed had an intrinsic viscosity of 0.636.

*Example 3*

This run was made in the same manner as Example 2 except that no 2,2-dimethoxypropane was added. The alcoholysis reaction required 70 minutes. The polyester obtained after two hours of condensation at 280° C. had an intrinsic viscosity of 0.575.

The material added to react with the free water should be neither acidic or basic, but should be neutral. The products formed by the reaction of the compounds of the invention are inert to the reaction mixture. They do not react with the esters or glycols in the reaction mixture or with the polymer formed. Also, the products are distillable and are easily removed from the reaction mixture.

The invention has been illustrated particularly with respect to the stabilization of dimethyl terephthalate and to the preparation of polyethylene terephthalate. It is also effective in stabilizing other esters such as the ethyl, propyl, butyl, and phenyl esters of acids and with glycols and other polyester-forming reactants. Thus the invention is applicable to the manufacture of linear polyesters derived from other acids and/or other glycols. Representative examples of other acids from which polyesters can be derived are aliphatic acids of the general formula

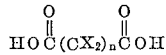

where X is hydrogen or a low alkyl group and $n$ is zero to ten such as oxalic acid, malonic acid, succinic acid, glutaric acid, adiphic acid, sebacic acid, suberic acid, etc.; methyl succinic acid, α-methyl adipic acid; aromatic acids such as the phthalic acids, the naphthalene dicarboxylic acids, the diphenyl dicarboxylic acids; and araliphatic acids such as α,β-diphenyl ethane-4,4'-dicarboxylic acid, α,δ-diphenyl butane 4,4'-dicarboxylic acid. Representative examples of other glycols with which the invention can be used are the propylene glycols, the butylene glycols, pentamethylene glycol, decamethylene glycol, alkyl substituted polymethylene glycols such as 2,2-dimethyl 1,3-propane diol, 2,2-diethyl 1,3-propane diol, 2-methyl, 2-ethyl-1,3 propane diol, diethylene glycol, 2,2-bis[4-(beta hydroxyethoxy)phenyl] propane and cyclohexane dimethanol. The invention can also be used to remove water from other polyhydric alcohols such as glycerine and penta-erythritol. The phthalic acids and ethylene glycol are preferred because of their low cost and ready availability.

The invention has been illustrated with respect to the use of 2,2-dimethoxypropane. Materials which are suitable for use as dehydrating agents according to the invention are acetals, organic ortho esters, organic carbonate esters, and cyclic ethers containing from 3 to 4 atoms in the ring. Representative examples of acetals are 1,3-dioxolanes such as 2-methyl-1,3-dioxolane, 2,2-dimethyl-1,3-oxolane, and other acetals, for example, methylal, ethylal, 1,1-diethoxy ethane, 2,2-diethoxy propane, 2,2-dimethoxy butane, and acetals of dialdehydes such as glyoxal tetraalkylacetals and similar acetal derivatives. Representative examples of ortho esters are trimethyl orthoformate, triethyl orthoformate, 2-ethoxy-1,3 oxolane, trimethyl orthoacetate, tetramethyl ortho carbonate. Representative organic carbonate esters are diethyl carbonate, dipropyl carbonate, and cyclic ethylene carbonate. Representative examples of cyclic ethers are ethylene oxide, 1,2-butylene oxide, 1,2-propylene oxide, etc. Preferred materials for use in the present invention are 2,2-dimethoxy propane, triethyl orthoformate, ethylene carbonate, and 1,2-butylene oxide.

The amount of additive used will be in the ratio of from 1 to 5 mols of the additive for each mol of free water present in the material to be dehydrated. Other amounts can be used if desired. The amount generally used will be in ratio of from 1 to 2 mols of the additive for each mol of free water present. At least one mol of the additive for each mol of free water present must be used to react with all of the free water.

The materials can be added in any stage of the ester interchange and condensation process for preparing polyesters in which moisture is present in the reactants or in the apparatus. Thus they can be added in the second stage of the process when bis glycol esters or low polymers thereof are condensed to form high molecular weight polyester. More commonly, however, they are added in the first stage of the ester interchange process in which bis esters of dicarboxylic acids are reacted with glycols. While the materials can be added to the ester interchange mixture just prior to or after the beginning of the ester interchange reaction, it is preferred to add them to the reactants and allow them to react with any water present and distill out the excess dehydrating agents and the products formed by the reaction with water before the ester interchange catalyst is added. This prevents deactivation of any of the catalyst, removes traces of water from the equipment and from the reactants and promotes the complete alcoholysis of the bis ester before the condensation polymerization reaction is begun.

While certain representative embodiments and details have been shown for the purpose of illustrating the invention, it will be apparent to those skilled in this art that various changes and modifications may be made therein without departing from the spirit or scope of the invention.

We claim:
1. A method of stabilizing an ester of an acid selected from the group consisting of terephthalic acid and isophthalic acid against hydrolysis which comprises adding to the ester in molten state from 1 to 5 mols per mol of water in said ester of a compound selected from the group consisting of acetals, organic ortho esters, organic carbonate esters and cyclic ethers containing from 3 to 4 atoms in the ring.
2. The method of claim 1 in which the ester is the dimethyl ester.
3. In a process for preparing a high molecular weight polymeric polyester by subjecting at least one of bis ester of an acid selected from the group consisting of terephthalic acid and isophthalic acid to alcoholysis in the presence of an excess of glycol and thereafter subjecting the glycol esters formed to condensation with the removal of glycol, the improvement which comprises adding an amount sufficient to react with the water in said ester of a compound selected from the group consisting of acetals, organic ortho esters, organic carbonate esters, and cyclic ethers containing from 3 to 4 atoms in the ring to said bis ester and thereafter subjecting the mixture to the alcoholysis and condensation reactions.
4. In a process for preparing a high molecular weight polymeric polyester by subjecting a bis glycol ester of at least one acid selected from the group consisting of terephtahlic acid and isophthalic acid to condensation with removal of glycol, the improvement which comprises adding to the bis glycol ester from 1 to 5 mols per mol of water in said ester of at least one material selected from the group consisting of acetals, organic ortho esters, organic carbonate esters, and cyclic ethers containing from 3 to 4 atoms in the ring and thereafter subjecting the bis glycol ester to condensation.
5. In a process for preparing a high molecular weight polymeric polyester of a polycarboxylic acid by alcoholysis of an ester of said polycarboxylic acid with an excess of a glycol, and subjecting the glycol ester formed to condensation with the removal of glycol, the improvement which comprises adding to at least one of the materials being reacted from 1 to 5 mols of 2,2-dimethoxy propane for each mol of free water in the material and thereafter subjecting the mixture to alcoholysis and condensation reactions.
6. In a process for preparing a high molecular weight polymeric polyester of a polycarboxylic acid by alcoholysis of an ester of said polycarboxylic acid with an excess of a glycol, and subjecting the glycol ester formed to condensation with the removal of glycol, the improvement which comprises adding to at least one of the materials being reacted from 1 to 5 mols of triethyl ortho formate for each mol of free water in the material and thereafter subjecting the mixture to alcoholysis and condensation reactions.
7. In a process for preparing a high molecular weight polymeric polyester of a polycarboxylic acid by alcoholysis of an ester of said polycarboxylic acid with an excess of glycol, and subjecting the glycol ester formed to condensation with the removal of glycol, the improvement which comprises adding to at least one of the materials being reacted from 1 to 5 mols of ethylene carbonate for each mol of free water in the material and thereafter subjecting the mixture to alcoholysis and condensation reactions.
8. In a process for preparing a high molecular weight polymeric polyester of a polycarboxylic acid by alcoholysis of an ester of said polycarboxylic acid with an excess of a glycol, and subjecting the glycol ester formed to condensation with the removal of glycol, the improvement which comprises adding to at least one of the materials being reacted from 1 to 5 mols of 1,2-butylene oxide for each mol of free water in the material and thereafter subjecting the mixture to alcoholysis and condensation reactions.

References Cited by the Examiner

UNITED STATES PATENTS

| | | | |
|---|---|---|---|
| 2,140,694 | 12/1938 | Evans | 260—499 |
| 2,630,425 | 3/1953 | Rodman | 260—75 |
| 2,720,500 | 10/1955 | Cody | 260—47 |
| 2,733,218 | 1/1956 | Basch et al. | 208—188 |
| 2,878,109 | 3/1959 | Wood et al. | 44—77 |
| 2,993,029 | 7/1961 | Georgian et al. | 260—475 |
| 3,014,011 | 12/1961 | Zoetbrood | 260—75 |
| 3,031,348 | 4/1962 | Beller | 149—109 |

FOREIGN PATENTS 1,034,854  4/1960  Germany.

OTHER REFERENCES

Erley: "Analytical Chemistry," American Chemicals Society, volume 29, No. 10, October 1957 (p. 1564 relied on).

Critchfield et al.: "Analytical Chemistry," American Chemical Society, volume 33, No. 8, July 1961 (pp. 1034–1035 relied on).

Glycols, George O. Curme, Jr., editor; published by Reinhold Publishing Corporation (New York), 1952 (p. 95 relied on).

LEON J. BERCOVITZ, *Primary Examiner.*

JOSEPH L. SCHOFER, *Examiner.*

F. McKELVEY, *Assistant Examiner.*